US008020142B2

(12) United States Patent
Wolrich et al.

(10) Patent No.: US 8,020,142 B2
(45) Date of Patent: Sep. 13, 2011

(54) HARDWARE ACCELERATOR

(75) Inventors: Gilbert M. Wolrich, Framingham, MA (US); William Hasenplaugh, Jamaica Plain, MA (US); Wajdi Feghali, Boston, MA (US); Daniel Cutter, Maynard, MA (US); Vinodh Gopal, Westboro, MA (US); Gunnar Gaubatz, Worcester, MA (US)

(73) Assignee: Intel Corporation, Santa Clara, CA (US)

( * ) Notice: Subject to any disclaimer, the term of this patent is extended or adjusted under 35 U.S.C. 154(b) by 1248 days.

(21) Appl. No.: 11/610,871

(22) Filed: Dec. 14, 2006

(65) Prior Publication Data

US 2008/0148024 A1    Jun. 19, 2008

(51) Int. Cl.
*G06F 9/44* (2006.01)
*G06F 9/45* (2006.01)
*G06F 7/38* (2006.01)

(52) U.S. Cl. ........ 717/106; 717/151; 717/159; 717/161; 708/490

(58) Field of Classification Search .................. None
See application file for complete search history.

(56) References Cited

U.S. PATENT DOCUMENTS

| | | | | |
|---|---|---|---|---|
| 6,078,745 A * | 6/2000 | De Greef et al. | ............ | 717/151 |
| 6,772,415 B1 * | 8/2004 | Danckaert et al. | ............ | 717/161 |
| 7,117,237 B2 * | 10/2006 | Amano et al. | ............ | 708/490 |
| 7,353,491 B2 * | 4/2008 | Gutberlet et al. | ............ | 716/104 |
| 7,367,026 B2 * | 4/2008 | Eichenberger et al. | ....... | 717/160 |
| 2002/0062444 A1 * | 5/2002 | Law | ............... | 713/189 |
| 2005/0188209 A1 * | 8/2005 | Chen et al. | ..... | 713/183 |
| 2005/0283775 A1 * | 12/2005 | Eichenberger et al. | ....... | 717/151 |
| 2006/0045263 A1 * | 3/2006 | Brokenshire et al. | ........... | 380/30 |
| 2006/0059220 A1 * | 3/2006 | Koshy et al. | .................. | 708/491 |
| 2006/0242622 A1 * | 10/2006 | Wang et al. | ..................... | 717/106 |
| 2007/0016635 A1 * | 1/2007 | Hubert et al. | ................. | 708/490 |

OTHER PUBLICATIONS

"Approximate greatest common divisors of several polynomials with linearly constrained coefficients and singular polynomials", Kaltofen et al., Jul. 2006, pp. 169-176, <http://delivery.acm.org/10.1145/1150000/1145799/p169-kaltofen.pdf>.*

"Key management for secure multicast over IPv6 wireless networks", Aye et al., Apr. 2006, pp. 1-12, <http://delivery.acm.org/10.1145/1290000/1283599/p75-aye.pdf>.*

"Modular inverse algorithms without multiplications for cryptographic applications", L. Hars, Jan. 2006, pp. 1-13, <http://delivery.acm.org/10.1145/1290000/1288225/p2-hars.pdf>.*

* cited by examiner

*Primary Examiner* — Thuy Dao
(74) *Attorney, Agent, or Firm* — Grossman, Tucker, Perreault & Pfleger PLLC (57) ABSTRACT

A method for instruction processing may include adding a first operand from a first register, a second operand from a second register and a carry input bit to generate a sum and a carry out bit, loading the sum into a third register and loading the carry out bit into a most significant bit position of the third register to generate a third operand, performing a single bit shift on the third operand via a shifter unit to produce a shifted operand and loading the shifted operand into the fourth register, loading a least significant bit from the sum into the most significant bit position of the fourth register to generate a fourth operand, generating a greatest common divisor (GCD) of the first and second operands via the fourth operand and generating a public key based on, at least in part, the GCD. Many alternatives, variations and modifications are possible.

23 Claims, 7 Drawing Sheets

HARDWARE ACCELERATOR

FIELD

The present disclosure describes a hardware accelerator capable of processing a variety of instructions.

BACKGROUND

Encryption algorithms may be classified as either private-key or public-key. Private-key encryption refers to an encryption method in which both the sender and receiver share the same key. Public-key encryption may involve two different but related keys. One key may be used for encryption and one for decryption. Many of today's encryption techniques utilize a public-key/private-key pair. Most public-key algorithms, such as Rivest, Shamir, Adelman (RSA) and Diffie-Helman, perform extensive computations of extremely large numbers. Further, these public key protocols may rely on large prime numbers and/or modular inverses that may be computationally intensive to generate. Hardware capable of processing these instructions effectively may be required in order to handle these operations in an efficient manner.

BRIEF DESCRIPTION OF DRAWINGS

Features of the claimed subject matter will be apparent from the following detailed description of embodiments consistent therewith, which description should be considered with reference to the accompanying drawings, wherein:

Although the following Detailed Description will proceed with reference being made to illustrative embodiments, many alternatives, modifications, and variations thereof will be apparent to those skilled in the art.

DETAILED DESCRIPTION

Public key exchange protocols may use a range of keys having different bit lengths. For example, some key exchange protocols may use keys having bit lengths of 1024, 2048, 3072, 4096, 8192 etc. During a public key negotiation, for example, between two parties over an untrusted network, each party may generate a public key. The security strength of the key is typically a function of the size (i.e., bit length) of the key. For example, to generate a key, each party may need to solve an equation of the form: $x = g^a \mod m$. Given two integers, $g^a$ and m, $g^a \mod m$ yields the remainder (r) of the division of $g^a$ by m. These types of calculations may be difficult given the large size of the operands. Moreover, some public key protocols (e.g., Chinese Remainder Theorem based private-key decryption, large-digit Montgomery Reduction, etc.) may require the calculation of modular inverses and may require the generation of large prime numbers that require additional extensive computations. Various algorithms such as, the greatest common divisor (GCD) algorithm may be used to assist in the processing of these computations.

Generally, this disclosure describes a hardware accelerator configured to perform operations on large multi-precision numbers. The embodiments described herein may be used to generate the large prime numbers and modular inverses required by many public-key protocols and other applications. The contents of this disclosure may be utilized to process a variety of security algorithms with increased performance.

Figure 1:
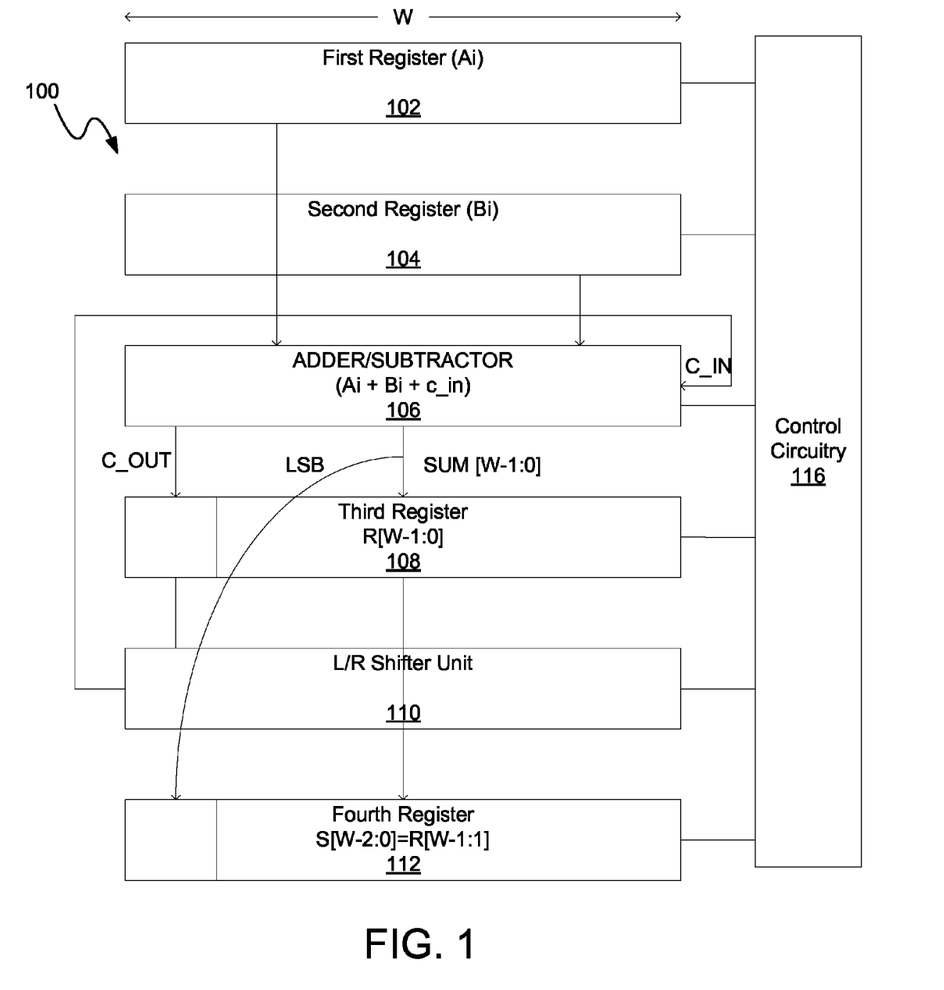
FIG. 1 is a block diagram showing one exemplary embodiment of the present disclosure.

FIG. 1 shows an exemplary embodiment of circuitry 100. In some embodiments, circuitry 100 may be used to compute the largest number that evenly divides two positive integers (i.e., GCD). There are numerous techniques that may be used to compute the GCD (e.g., binary GCD, Lehmer's GCD, binary extended GCD, etc.) A more thorough analysis of these techniques may be found in *The Handbook of Applied Cryptography* authored by Alfred Menezes et al., published Jan. 1, 1997 by CRC press.

In one exemplary embodiment, circuitry 100 may be configured to process a binary GCD algorithm. The binary GCD algorithm may provide an efficient implementation because it may not require any division operations, which may negatively affect performance and overhead. An example of the binary GCD algorithm is provided below:

| Binary Greatest Common Divisor (GCD) Algorithm |
| --- |
| INPUT: 2 positive integers x, y with $x \geq y$<br>OUTPUT: gcd (x,y)<br>  1. $g \leftarrow 1$<br>  2. While both x and y are even do: $x \leftarrow x/2$, $y \leftarrow y/2$, $g \leftarrow 2g$<br>  3. While $x \neq 0$ do:<br>    a. While x is even do $x \leftarrow x/2$<br>    b. While y is even do $y \leftarrow y/2$<br>    c. $t \leftarrow |(x-y)|/2$<br>    d. If $x \geq y$, then $x \leftarrow t$; else $y \leftarrow t$<br>  4. Return (g*y) |

Table 1 below shows an example for computing the GCD of two numbers (1764, 868) using the binary GCD algorithm shown above. In this example, given x=1764 and y=868, the resultant GCD is found to be G*Y (4*7) or 28.

TABLE 1

| X | 1764 | 441 | 112 | 7   | 7   | 7  | 7  | 7 | 0 |
|---|------|-----|-----|-----|-----|----|----|---|---|
| Y | 868  | 217 | 217 | 217 | 105 | 49 | 21 | 7 | 7 |
| G | 1    | 4   | 4   | 4   | 4   | 4  | 4  | 4 | 4 |

Circuitry 100 may include first and second registers 102 and 104. Each register may be configured to receive and hold a number of bits (e.g., 8, 16, 32, 64 bits, etc.). For example, first register 102 may be configured to hold a first operand from a first vector and second register 104 may be similarly configured to hold a second operand from a second vector. First and second registers may receive operands from a variety of different sources, such as the Data RAMs shown in FIG. 5. In the example shown in Table 1 above, first operand may be the binary representation of 1764 and second operand may be the binary representation of 868. Circuitry 100 may use the contents of first register 102 and second register 104 to compute the greatest common divisor of two vectors. For example, a 512 bit vector may be broken up into 8 distinct 64 bit sections. This vector may be stored in register files, such as data RAMs 502, 504 before being loaded into first and second registers 102, 104 in 64 bit increments.

Circuitry 100 may also include an adder/subtractor 106 that may receive the first and second operands from first and second registers 102 and 104 respectively. Adder/subtractor 106 may be configured to perform operations upon the first and second operands. For example, first and second operands may be loaded into adder/subtractor 106 from first and second registers 102, 104. Adder/subtractor may perform the operation and then load the result into a third register 108. Further, adder/subtractor 106 may also receive a carry-in bit from an additional device, such as shifter unit 110.

In some embodiments this carry-in bit may be added to the first operand and the second operand to yield a sum, which may subsequently be loaded into third register 108. A carry-out bit may also be produced by adder/subtractor 106 and delivered to third register 108. The contents of third register 108 may be loaded into a shifter unit 110, which may be configured to alternate between left and right-shifting modes as necessary. The operation of shifter unit 110 may be altered and/or set using control circuitry 116. In some embodiments, a right shift performed by shifter unit 110 may correspond to dividing by two in the binary GCD algorithm described above. The operands described herein may be extremely large numbers that may require a series of right shift operations on each word of the operand.

Shifter unit 110 may produce an overflow bit (i.e., carry-flag) that may be provided as a carry-in to adder/subtractor 106. The carry flag may be a single bit in a register (e.g. third register 108) that may be used to indicate when an arithmetic carry or borrow has been generated out of the most significant bit position. In some embodiments, the carry flag may also be used as an extra operand for certain instructions (e.g. a subtract with carry instruction, a shift instruction, or a rotate through carry instruction). In these instructions, the carry may be an input (i.e. the result depends on the value of the carry flag before the instruction) and an output (i.e. the carry flag may be changed by the instruction). The use of the carry flag in this manner may enable multi-word add, subtract, shift, or rotate operations.

Following the shifting operation, the contents of shifter unit 110 may be loaded into fourth register 112. Additionally or alternatively, the least significant bit (LSB) of the resultant sum from adder/subtractor 106 may be loaded into the most significant bit (MSB) position of fourth register 112 to generate a fourth operand. In other words, the MSB of the shifted output may come from the LSB of the following word.

In some embodiments circuitry 100 may be configured to process a binary extended GCD algorithm. The binary extended GCD algorithm may be used to compute modular inverses required by some public key protocols. The binary extended GCD algorithm may also require the efficient computation of $A \leftarrow (A+y)/2$, thus requiring a combined add having a right-shift capability. As described above, the addition operation may be performed using adder/subtractor 106 and the division operation (i.e., dividing by two) may be accomplished using a single right shift operation (e.g., via shifter unit 110). Again, since the operands may be extremely large numbers having multiple words, each word of the operand may require a right-shift. The binary extended GCD algorithm may also require the calculation of $u \leftarrow u-v$, where $u \leftarrow u/2$ if u is an even number. Similarly, this calculation may require a subtraction via adder/subtractor 106 as well as the capability to perform a conditional right-shift operation via shifter unit 110. Thus, if the result of the subtraction from adder/subtractor 106 yields an even number, shifter unit 110 may perform a right-shift operation. A more detailed example showing one possible embodiment of the operation of circuitry 100 is provided below in Table 2.

Circuitry 100 may be configured to process a variety of different instructions (i.e. in addition to the binary GCD algorithm described above) and to perform extensive computations on vectors of arbitrary length. For example, circuitry 100 may be used to perform the combined operation $Y=(A+B)/2$ shown below, where A, B, and Y are 16 word vectors. In this example, the combined vector operation may be computed in 17 cycles (i.e., N+1, where the input vectors are N words each). Table 2 shows one possible sequence of operations that may be used in accordance with circuitry 100.

TABLE 2

At the end of Cycle0, $<c1, R> = A0 + B0$      // SUM0
At the end of Cycle1, $<c2, R> = A1 + B1 + c1$, $S(W-1) = lsb(SUM1)$, $S(W-2:0) = (A0 + B0)/2$;
write $Y0 \leftarrow S$
At the end of Cycle2, $<c3, R> = A2 + B2 + c2$, $S(W-1) = lsb(SUM2)$, $S(W-2:0) = (A1+B1+c1)/2$; write $Y1 \leftarrow S$
...
At the end of Cycle15, $<c16, R> = A15+B15+c15$, $S(W-1) = lsb(SUM15)$, $S(W-2:0) = (A14+B14+c14)/2$; write $Y14 \leftarrow S$
At the end of Cycle16, $<c17, R> = 0+0+c16$, $S(W-1) = lsb(SUM16) = c16$, $S(W-2:0) = (A15+B15+c15)/2$; write $Y15 \leftarrow S$ In operation, in order to perform a combined conditional right-shift operation, control circuitry 116 may check the least significant bit of the sum (e.g., SUM0 in Table 2 above) and follow the cyclical structure shown above if that least significant bit is zero. If not, the unshifted SUM words may be written back to Y in 17 cycles. The shift-carry flag may hold the least significant bit of SUM0 at the end of the operation. This information may be used to determine whether a shift has occurred.

In contrast, a combined left-shift operation may be less involved, since the addition/subtraction computations and shift operations may be in the same direction. Shifter 110 may perform a left-shift using the shift-carry flag. Further, the left-shift operation may not require a bypass mechanism between the adder/subtractor 106 and shifter 110.

Figure 2:
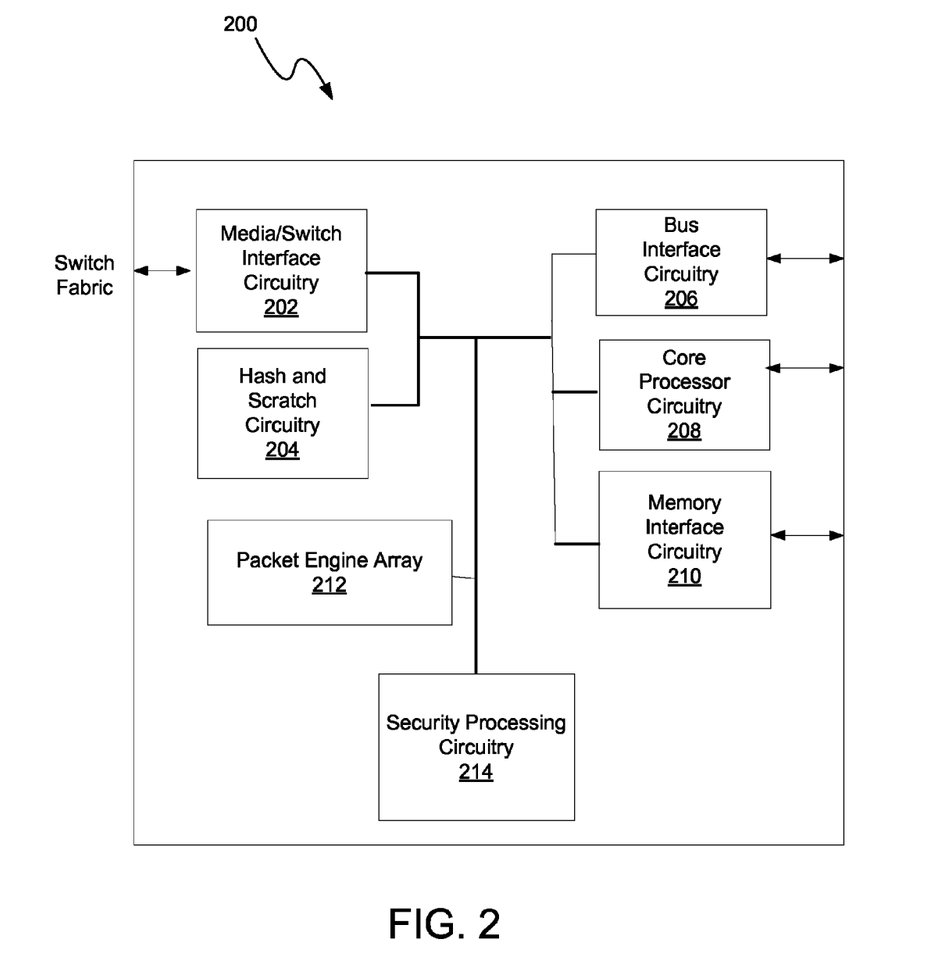
FIG. 2 is a block diagram depicting portions of a network processor in accordance with one embodiment of the present disclosure.

The methodology of FIG. 1 may be implemented, for example, in a variety of multi-threaded processing environments. For example, FIG. 2 is a diagram illustrating one exemplary integrated circuit embodiment (IC) 200, which may be configured to include some or all of the circuitry of FIG. 1. "Integrated circuit", as used in any embodiment herein, means a semiconductor device and/or microelectronic device, such as, for example, but not limited to, a semiconductor integrated circuit chip. The IC 200 of this embodiment may include features of an Intel® Internet eXchange network processor (IXP). However, the IXP network processor is only provided as an example, and the operative circuitry described herein may be used in other network processor designs and/or other multi-threaded integrated circuits.

The IC 200 may include media/switch interface circuitry 202 (e.g., a CSIX interface) capable of sending and receiving data to and from devices connected to the integrated circuit such as physical or link layer devices, a switch fabric, or other processors or circuitry. The IC 200 may also include hash and scratch circuitry 204 that may execute, for example, polynomial division (e.g., 48-bit, 64-bit, 128-bit, etc.), which may be used during some packet processing operations. The IC 200 may also include bus interface circuitry 206 (e.g., a peripheral component interconnect (PCI) interface) for communicating with another processor such as a microprocessor (e.g. Intel Pentium®, etc.) or to provide an interface to an external device such as a public-key cryptosystem (e.g., a public-key accelerator) to transfer data to and from the IC 200 or external memory. The IC may also include core processor circuitry 208. In this embodiment, core processor circuitry 208 may comprise circuitry that may be compatible and/or in compliance with the Intel® XScale™ Core micro-architecture described in "Intel® XScale™ Core Developers Manual," published December 2000 by the Assignee of the subject application. Of course, core processor circuitry 208 may comprise other types of processor core circuitry without departing from this embodiment. Core processor circuitry 208 may perform "control plane" tasks and management tasks (e.g., look-up table maintenance, etc.). Alternatively or additionally, core processor circuitry 208 may perform "data plane" tasks (which may be typically performed by the packet engines included in the packet engine array 218, described below) and may provide additional packet processing threads.

Integrated circuit 200 may also include a packet engine array 218. The packet engine array may include a plurality of packet engines. Each packet engine may provide multi-threading capability for executing instructions from an instruction set, such as a reduced instruction set computing (RISC) architecture. Each packet engine in the array 218 may be capable of executing processes such as packet verifying, packet classifying, packet forwarding, and so forth, while leaving more complicated processing to the core processor circuitry 208. Each packet engine in the array 218 may include e.g., eight threads that interleave instructions, meaning that as one thread is active (executing instructions), other threads may retrieve instructions for later execution. Of course, one or more packet engines may utilize a greater or fewer number of threads without departing from this embodiment. The packet engines may communicate among each other, for example, by using neighbor registers in communication with an adjacent engine or engines or by using shared memory space.

Integrated circuit 200 may also include memory interface circuitry 210. Memory interface circuitry 210 may control read/write access to external memory. Machine readable firmware program instructions may be stored in external memory, and/or other memory internal to the IC 200. These instructions may be accessed and executed by the integrated circuit 200. When executed by the integrated circuit 200, these instructions may result in the integrated circuit 200 performing the operations described herein.

IC 200 may further include security processing circuitry 214. Security processor circuitry 214 may be configured to perform portions of any or all of the embodiments described herein, including, but not limited to, encryption operations which may include modular exponentiation operations, greatest common divisor operations and/or any other operations that may be used in the generation of a public key.

Figure 3:
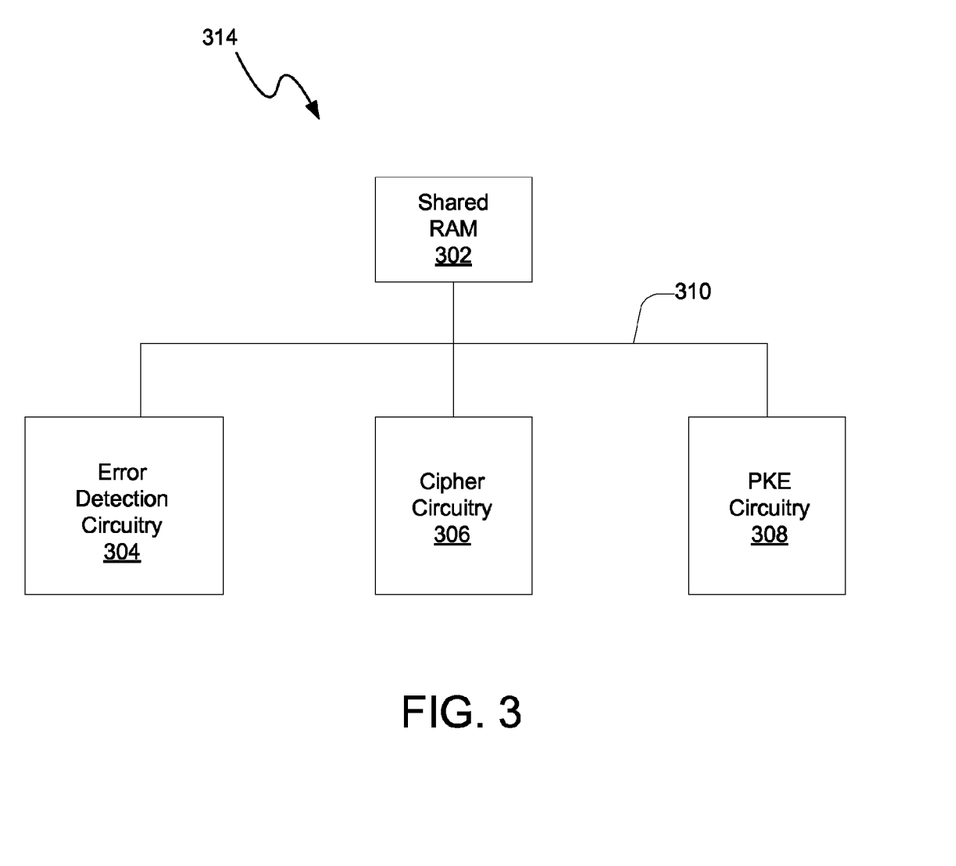
FIG. 3 is a block diagram showing further detail of a security processor in accordance with an embodiment of the present disclosure.

Referring now to FIG. 3, security processing circuitry 314 may include shared RAM 302 operatively connected to error detection circuitry 304, cipher circuitry 306 and public key encryption (PKE) circuitry 308 through internal bus 310. Error detection circuitry 304 may be configured to perform hash functions that may be used as a redundancy check or checksum. Some types of redundancy checks could include, but are not limited to, parity bits, check digits, longitudinal redundancy checks, cyclic redundancy checks, horizontal redundancy check, vertical redundancy checks, and cryptographic message digest. Security processing circuitry 314 may include both private and public key modules. Cipher circuitry 306 may be configured to generate private keys, which may include execution of symmetric and/or private-key data encryption algorithms such as the data encryption standard (DES) or advanced encryption standard (AES). PKE circuitry 308 may be configured to execute an asymmetric key encryption algorithm and may include generating a public-key/private-key pair.

Figure 4:
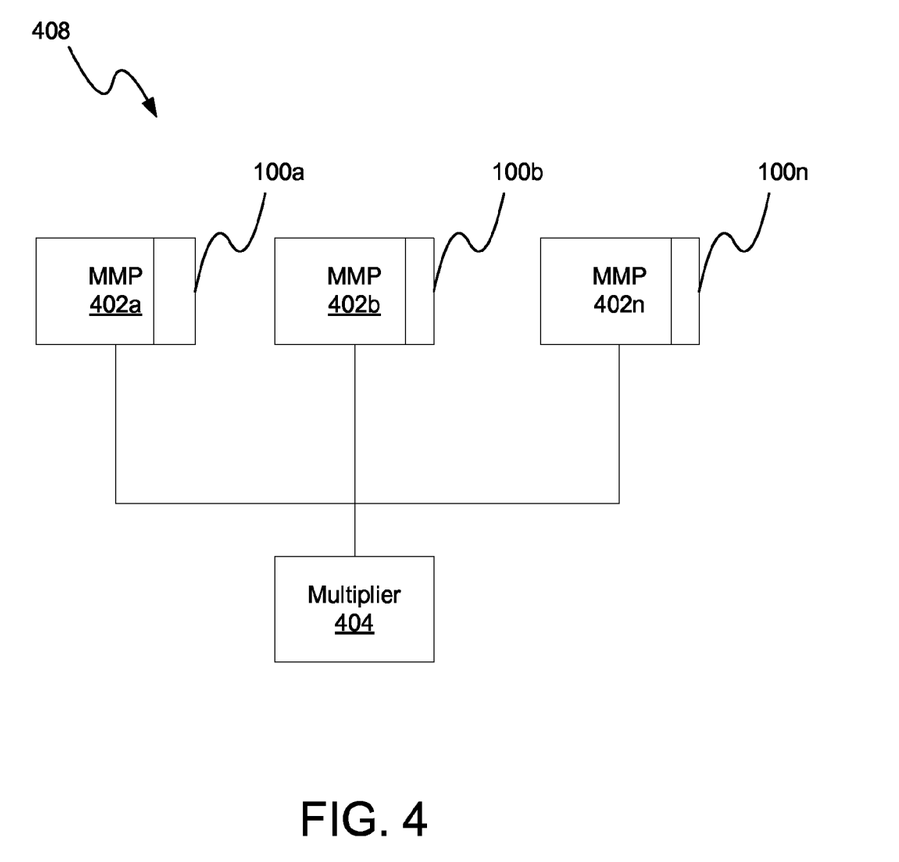
FIG. 4 is a block diagram showing encryption circuitry in accordance with an embodiment of the present disclosure.

One embodiment of PKE circuitry 408 is shown in FIG. 4. PKE circuitry 408 may include a plurality of modular math processors (MMPs) 402a, 402b, . . . , 402n. Each MMP may include at least one arithmetic circuitry unit (ALU) (not shown), which may be configured to perform vector operations. Further, some of the embodiments described herein, such as those shown in FIG. 1, may be implemented in the central ALU datapath within MMPs 402. MMPs 402 may include a control store for the operations described herein as well as large register files configured to store operands, temporary variables and final results. Of course, the embodiments and methods described herein may be used with general purpose processors as well.

PKE circuitry 408 may further include a multiplier 404 operatively connected to modular math processors 402a-n. In at least one embodiment, multiplier 404 may be a large (e.g., 515×515) unsigned integer multiplier. In some embodiments, MMPs 402 may be configured to perform the GCD algorithms described herein. Of course, other instructions, such as those used in the computation of modular inverses may be used as well without departing from the scope of the present disclosure.

Figure 5:
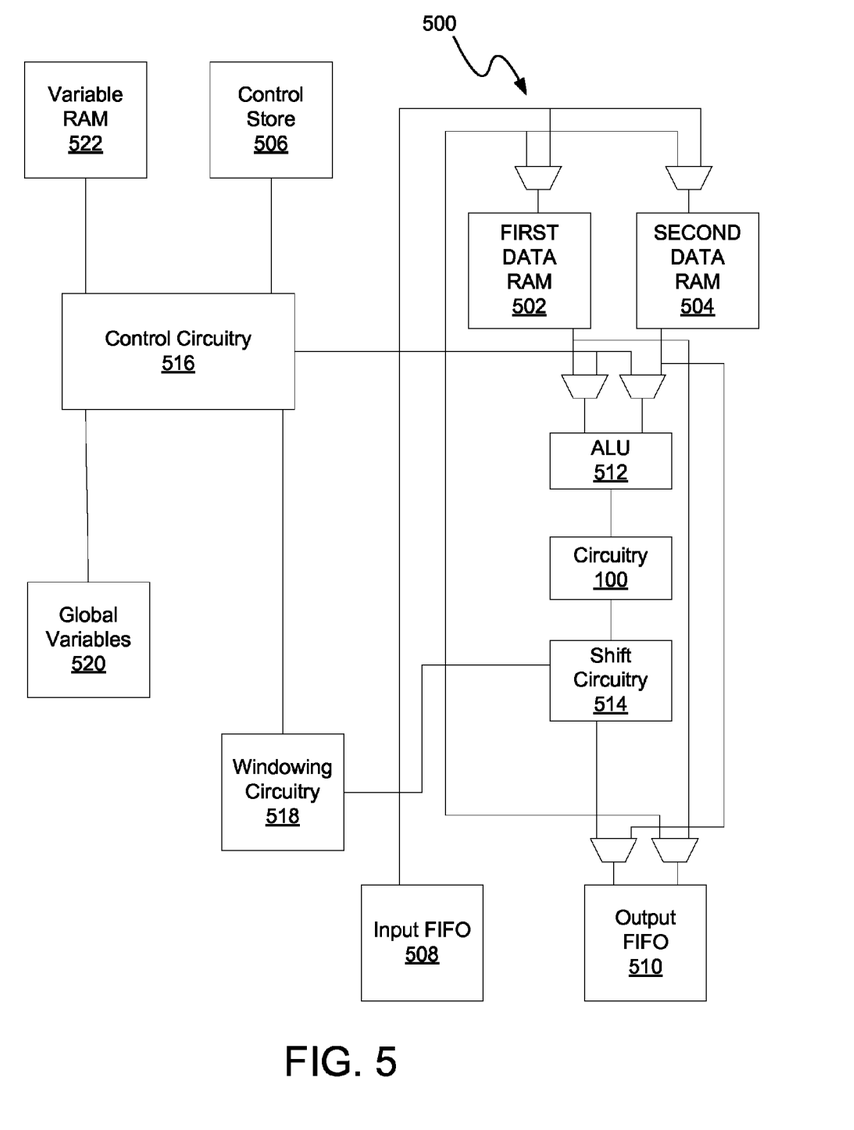
FIG. 5 is a block diagram showing one embodiment of a modular math processor.

Referring now to FIG. 5 an exemplary embodiment of an MMP 500 is shown. MMP 500 may be configured to perform operations on large operands (e.g., 512 to 8000 bits) that may be contained in a smaller data path (e.g., 32, 64, 128 bits) in order to accomplish large operand multiplication, addition, exponentiation and/or modular reduction techniques, such as Barrett's and Montgomery reduction. MMP 500 may include first and second data RAMs 502, 504, control store memory 506 and input and output FIFOs 508 and 510. MMP 500 may further include ALU 512, shift circuitry 514 and control circuitry 516. Control circuitry 516 may be in communication with windowing circuitry 518, global variables 520 and variable RAM 522. MMP 500 may additionally include circuitry 100 in accordance with the embodiments described herein. Circuitry 100 may be in communication with ALU 512 and may be configured to process a variety of algorithms including, but not limited to, binary GCD, Lehmer's GCD and binary extended GCD algorithms. Although circuitry 100 is shown between ALU 512 and shift circuitry 514, it is envisioned that circuitry 100 may be located in a variety of different locations within MMP 500.

Figure 6:
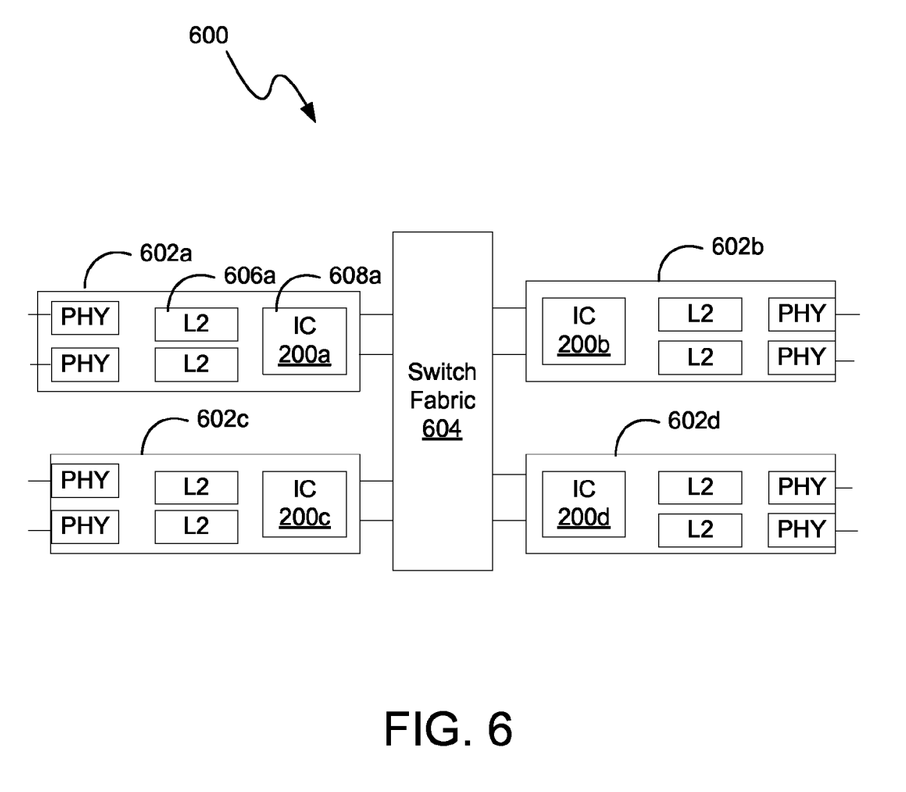
FIG. 6 is a diagram illustrating one exemplary system embodiment.

FIG. 6 depicts one exemplary system embodiment 600. This embodiment may include a collection of line cards 602a, 602b, 602c and 602d ("blades") interconnected by a switch fabric 604 (e.g., a crossbar or shared memory switch fabric). The switch fabric 604, for example, may conform to CSIX or other fabric technologies such as HyperTransport™, I/O Link Specification, Revision 3.0, available from HyperTransport™ Technology Consortium, Apr. 21, 2006; Infiniband™, Specification 1.2, available from InfiniBand™ Trade Association, Sep. 8, 2004; PCI-X 2.0, Revision 1.0, Apr. 5, 2002; Packet-Over-SONET; RapidIO, Specification 1.3, available from RapidIO Trade Association, June 2005; and Utopia Specification Level 1, Version 2.01, available from the ATM Forum, Mar. 21, 1994. Individual line cards (e.g., 602a) may include one or more physical layer (PHY) devices 602a (e.g., optic, wire, and wireless PHYs) that handle communication over network connections. The PHYs may translate between the physical signals carried by different network mediums and the bits (e.g., "0"-s and "1"-s) used by digital systems. The line cards may also include framer devices 606a (e.g., Ethernet, Synchronous Optic Network (SONET), High-Level Data Link (HDLC) framers or other "layer 2" devices) that can perform operations on frames such as error detection and/or correction. The line cards shown may also include one or more integrated circuits, e.g., 200a, which may include network processors, and may be embodied as integrated circuit packages (e.g., ASICs). In addition to the embodiments described herein, in this embodiment integrated circuit 200a may also perform packet processing operations for packets received via the PHY(s) 602a and direct the packets, via the switch fabric 604, to a line card providing the selected egress interface.

Figure 7:
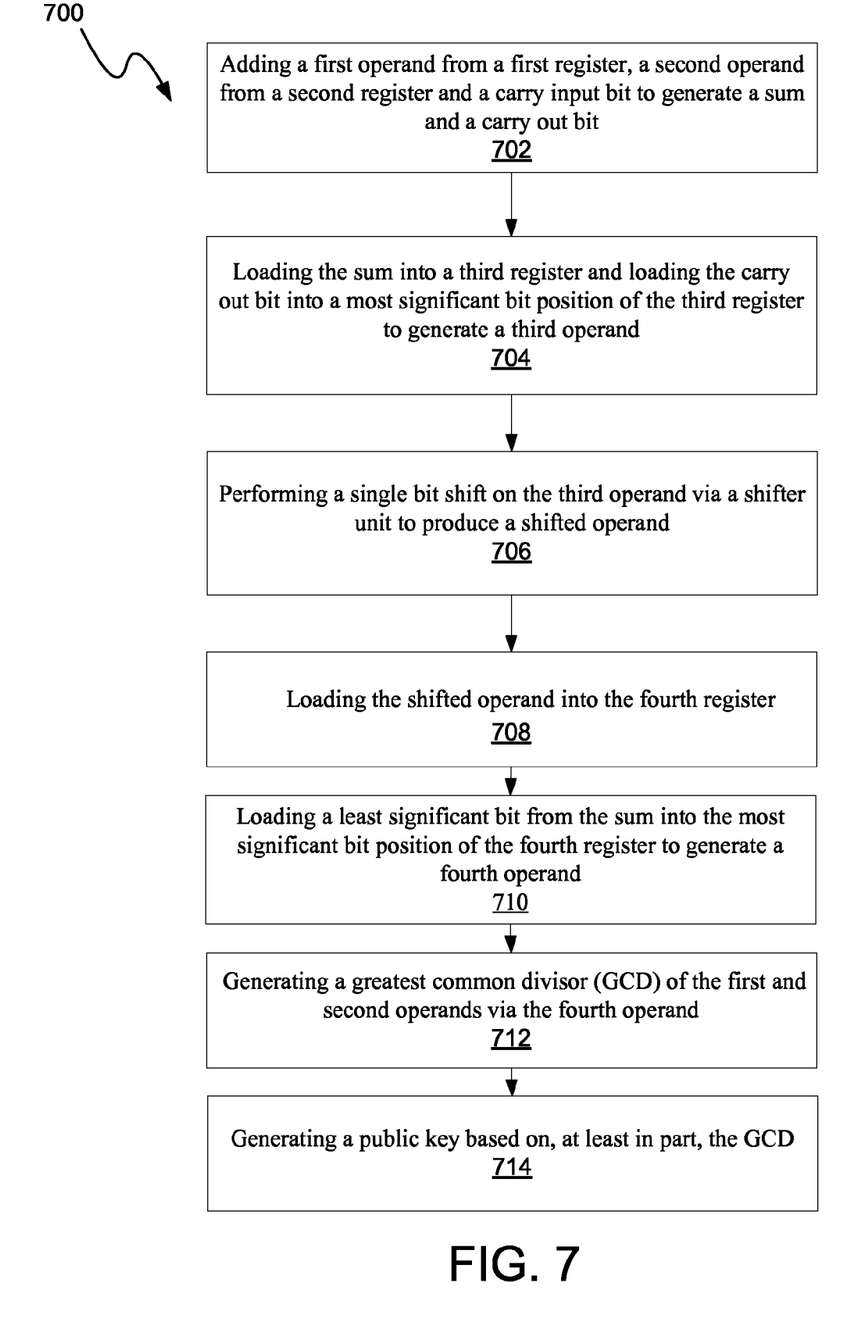
FIG. 7 is a flowchart depicting operations in accordance with another exemplary embodiment.

FIG. 7 depicts a flowchart 700 having operations in accordance with one exemplary embodiment of the present disclosure. Operations may include adding a first operand from a first register, a second operand from a second register and a carry input bit to generate a sum and a carry out bit (702). Operations may further include loading the sum into a third register and loading the carry out bit into a most significant bit position of the third register to generate a third operand (704). Operations may also include performing a single bit shift on the third operand via a shifter unit to produce a shifted operand (706). Operations may additionally include loading the shifted operand into the fourth register (708) and loading a least significant bit from the sum into the most significant bit position of the fourth register to generate a fourth operand (710). Operations may further include generating a greatest common divisor (GCD) of the first and second operands via the fourth operand (712). Operations may further include generating a public key based on, at least in part, the GCD (714).

As used in any embodiment described herein, "circuitry" may comprise, for example, singly or in any combination, hardwired circuitry, programmable circuitry, state machine circuitry, and/or firmware that stores instructions executed by programmable circuitry. It should be understood at the outset that any of the operations and/or operative components described in any embodiment herein may be implemented in software, firmware, hardwired circuitry and/or any combination thereof.

In alternate embodiments, FIGS. 2, 3, 4, 5 and/or 6 may be configured as a "network device", which may comprise for example, a switch, a router, a hub, and/or a computer node element configured to process data packets, a plurality of line cards connected to a switch fabric (e.g., a system of network/telecommunications enabled devices) and/or other similar device. Also, the term "cycle" as used herein may refer to clock cycles. Alternatively, a "cycle" may be defined as a period of time over which a discrete operation occurs which may take one or more clock cycles (and/or fraction of a clock cycle) to complete. Additionally, the operations described above with reference to FIG. 7 may be executed on one or more integrated circuits of a computer node element, for example, executed on a host processor (which may comprise, for example, an Intel® Pentium® microprocessor and/or an Intel® Pentium® D dual core processor and/or other processor that is commercially available from the Assignee of the subject application) and/or chipset processor and/or application specific integrated circuit (ASIC) and/or other integrated circuit.

Embodiments of the methods described above may be implemented in a computer program that may be stored on a storage medium having instructions to program a system to perform the methods. The storage medium may include, but is not limited to, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, magnetic or optical cards, or any type of media suitable for storing electronic instructions. Other embodiments may be implemented as software modules executed by a programmable control device.

The embodiments described herein may provide numerous advantages over the prior art. For example, this disclosure may provide a hardware acceleration unit configured to perform addition and subtraction operations having a conditional right and/or left shift capability. The embodiments described herein may be used to increase performance on algorithms such as the greatest common divisor and extended greatest common divisor algorithms. Of course, other algorithms and/or instructions may also be used in accordance with this disclosure.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents.

What is claimed is:
1. A method comprising:
adding, by an adder/subtractor, a first operand from a first register, a second operand from a second register and a carry input bit to generate a sum and a carry out bit;
loading the sum into a third register and loading the carry out bit into a most significant bit position of the third register to generate a third operand;
performing a single bit shift on the third operand by a shifter unit to produce a shifted operand wherein a mode of the shifter unit is set by control circuitry, the mode corresponding to one of a left shift and a right shift and a right shift corresponds to dividing the third operand by two;
loading the shifted operand into the fourth register;
loading a least significant bit from the sum into the most significant bit position of the fourth register to generate a fourth operand;
generating a greatest common divisor (GCD) of the first and second operands using the fourth operand; and
generating a public key, based on, at least in part, the GCD.
2. The method according to claim 1, further comprising:
loading the first and second operands from at least one data RAM into the first register and the second register.
3. The method according to claim 1, wherein:
the single bit shift is a conditional right shift.
4. The method according to claim 1, further comprising:
loading a least significant bit of the sum to a most significant bit of the fourth register.
5. The method according to claim 1, further comprising:
utilizing the GCD to compute a modular inverse, which may be used to generate, at least in part, a public key.
6. The method according to claim 5, wherein:
the modular inverse is used in Chinese remainder theorem based private-key decryption or large-digit Montgomery reduction operations.

7. The method of claim 1, wherein:
the first operand is one of N operands included in a first vector, the second operand is one of N operands included in a second vector and the method is configured to process the N operands from the first vector and the N operands from the second vector in N+1 cycles.

8. An apparatus, comprising:
an integrated circuit (IC) comprising:
a first register configured to receive and hold a first operand;
a second register configured to receive and hold a second operand;
a third register and a fourth register;
an adder/subtractor;
a shifter unit; and
control circuitry configured to set a mode of the shifter unit wherein the mode corresponds to one of a left shift and a right shift,
the adder/subtractor configured to add the first operand from the first register, the second operand from the second register and a carry input bit from the shifter unit to generate a sum and a carry out bit;
the adder/subtractor further configured to load the sum into the third register and to load the carry out bit into the most significant bit position of the third register to generate a third operand;
the shifter unit configured to perform a single bit shift on the third operand to produce a shifted operand wherein a right shift corresponds to dividing the third operand by two;
the IC configured to load the shifted operand into the fourth register and to load a least significant bit from the sum into the most significant bit position of the fourth register to generate a fourth operand; and
the IC configured to generate a greatest common divisor (GCD) of the first and second operands using the fourth operand, the IC further configured to generate a public key, based on, at least in part, the GCD.

9. The apparatus of claim 8, wherein:
the single bit shift is a conditional right shift.

10. The apparatus of claim 8, wherein:
the first register and the second register are configured to receive the first and second operands from at least one data RAM.

11. The apparatus of claim 8, wherein:
the GCD is used to compute a modular inverse, which may be used to generate, at least in part, a public key.

12. The apparatus of claim 11, wherein:
the modular inverse is used in Chinese remainder theorem based private-key decryption or large-digit Montgomery reduction operations.

13. The apparatus of claim 8, wherein:
the first operand is one of N operands included in a first vector, the second operand is one of N operands included in a second vector and the IC is configured to process the N operands from the first vector and the N operands from the second vector in N+1 cycles.

14. An article comprising a storage medium having stored thereon instructions that when executed by a machine result in the following:
adding, by an adder/subtractor, a first operand from a first register, a second operand from a second register and a carry input bit to generate a sum and a carry out bit;
loading the sum into a third register and loading the carry out bit into a most significant bit position of the third register to generate a third operand;
performing a single bit shift on the third operand by a shifter unit to produce a shifted operand wherein a mode of the shifter unit is set by control circuitry, the mode corresponding to one of a left shift and a right shift and a right shift corresponds to dividing the third operand by two;
loading the shifted operand into the fourth register;
loading a least significant bit from the sum into the most significant bit position of the fourth register to generate a fourth operand;
generating a greatest common divisor (GCD) of the first and second operands using the fourth operand; and
generating a public key, based on, at least in part, the GCD.

15. The article of claim 14, wherein:
loading the first and second operands from at least one data RAM into the first register and the second register.

16. The article of claim 14, wherein:
the single bit shift is a conditional right shift.

17. The article of claim 14, further comprising:
loading a least significant bit of the sum to a most significant bit of the fourth register.

18. The article of claim 14, further comprising:
computing a modular inverse using the GCD, the modular inverse capable of being used to generate, at least in part, a public key.

19. The article of claim 18, wherein:
the modular inverse is used in Chinese remainder theorem based private-key decryption or large-digit Montgomery reduction operations.

20. The article of claim 14, wherein:
the first operand is one of N operands included in a first vector, the second operand is one of N operands included in a second vector and the instructions when executed by the machine are further configured to result in processing the N operands from the first vector and the N operands from the second vector in N+1 cycles.

21. A system comprising:
a switch fabric operatively connected to a plurality of line cards; and
an integrated circuit (IC) comprising:
a first register configured to receive and hold a first operand;
a second register configured to receive and hold a second operand;
a third register and a fourth register;
an adder/subtractor;
a shifter unit; and
control circuitry configured to set a mode of the shifter unit wherein the mode corresponds to one of a left shift and a right shift,
the adder/subtractor configured to add the first operand from the first register, the second operand from the second register and a carry input bit from the shifter unit to generate a sum and a carry out bit;
the adder/subtractor further configured to load the sum into the third register and to load the carry out bit into the most significant bit position of the third register to generate a third operand;
the shifter unit configured to perform a single bit shift on the third operand unit to produce a shifted operand wherein a right shift corresponds to dividing the third operand by two;
the IC configured to load the shifted operand into the fourth register and to load a least significant bit from the sum into the most significant bit position of the fourth register to generate a fourth operand; and the IC further configured to generate a greatest common divisor (GCD) of the first and second operands using the fourth operand, the IC further configured to generate a public key, based on, at least in part, the GCD.

22. The system of claim 21, wherein:
the single bit shift is a conditional right shift.

23. The system of claim 21, wherein:
the first operand is one of N operands included in a first vector, the second operand is one of N operands included in a second vector and the IC is configured to process the N operands from the first vector and the N operands from the second vector in N+1 cycles.

* * * * *